Nov. 6, 1928.   1,690,874
W. W. OSBORNE
ISSUING AND RECORDING TRADE CHECK CREDIT MACHINE
Original Filed July 10, 1920   5 Sheets-Sheet 2
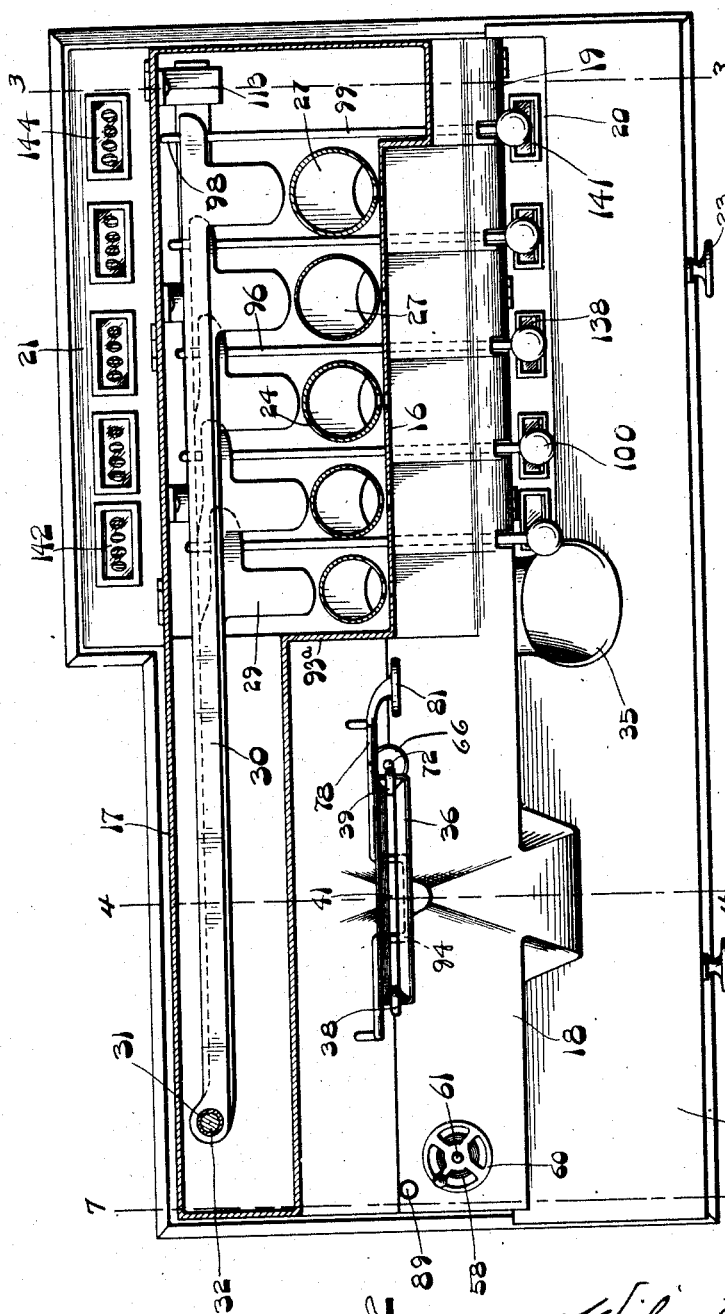
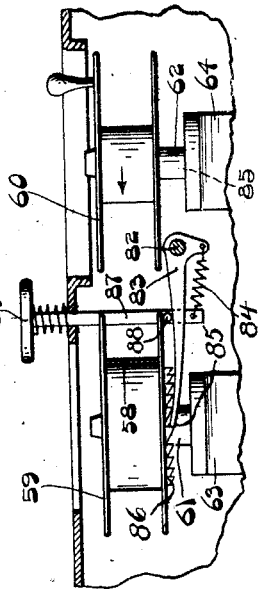
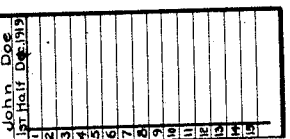

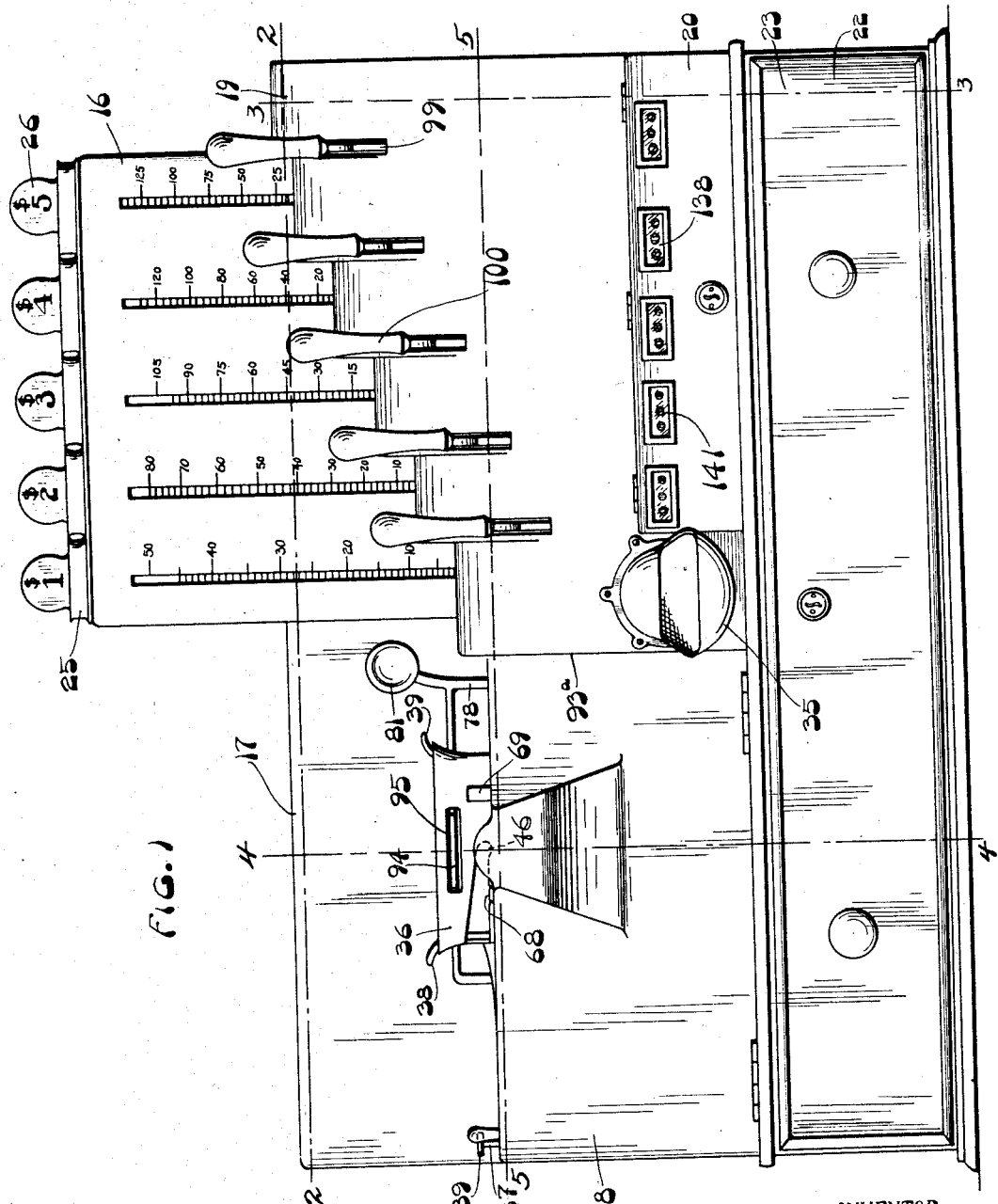

Nov. 6, 1928.
W. W. OSBORNE
1,690,874
ISSUING AND RECORDING TRADE CHECK CREDIT MACHINE
Original Filed July 10, 1920   5 Sheets-Sheet 3
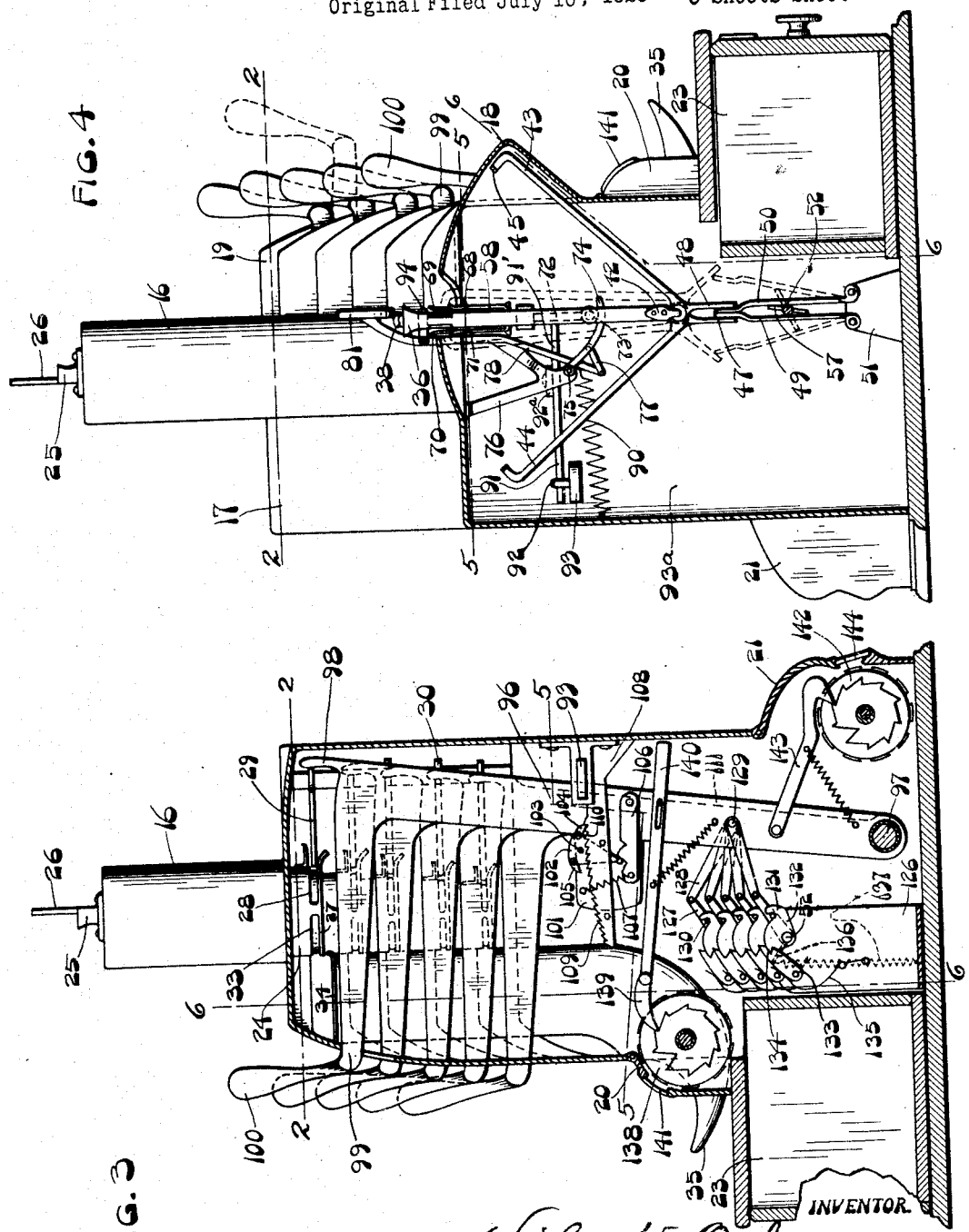
INVENTOR.
Wiley W. Osborne
BY
James N. Ramsey
ATTORNEY.

Nov. 6, 1928.
W. W. OSBORNE
1,690,874
ISSUING AND RECORDING TRADE CHECK CREDIT MACHINE
Original Filed July 10, 1920    5 Sheets-Sheet 4
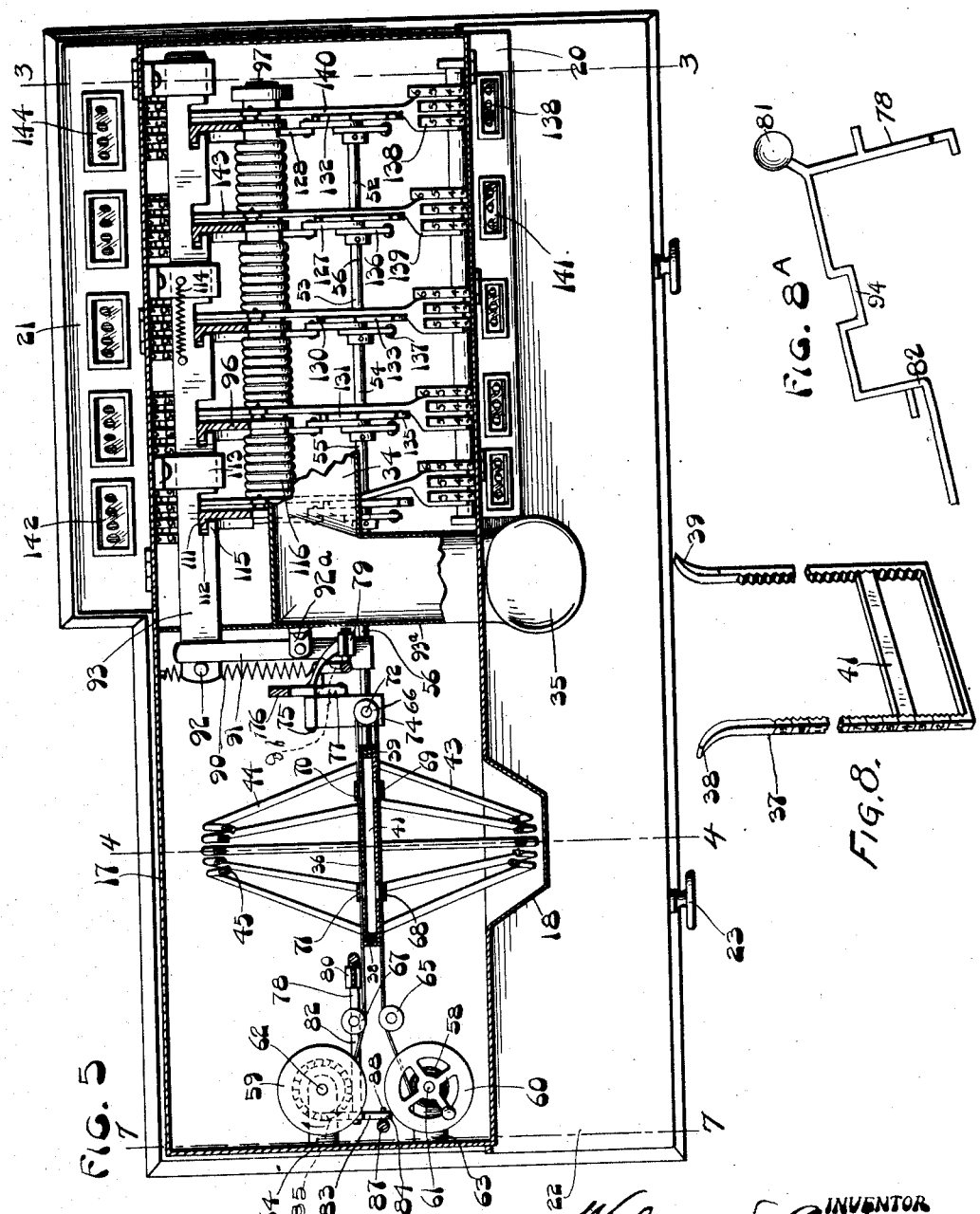
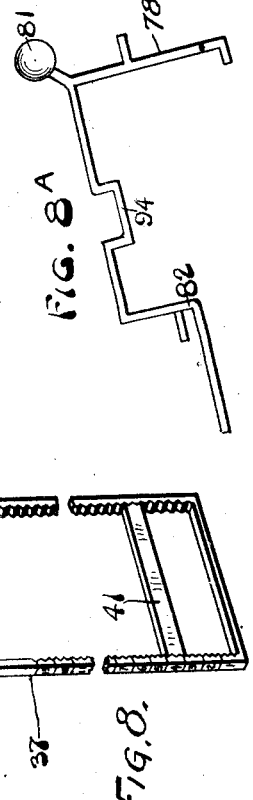
INVENTOR
Wiley W. Osborne,
BY
James N. Ramsey
ATTORNEY.

Nov. 6, 1928.
W. W. OSBORNE
1,690,874
ISSUING AND RECORDING TRADE CHECK CREDIT MACHINE
Original Filed July 10, 1920    5 Sheets-Sheet 5
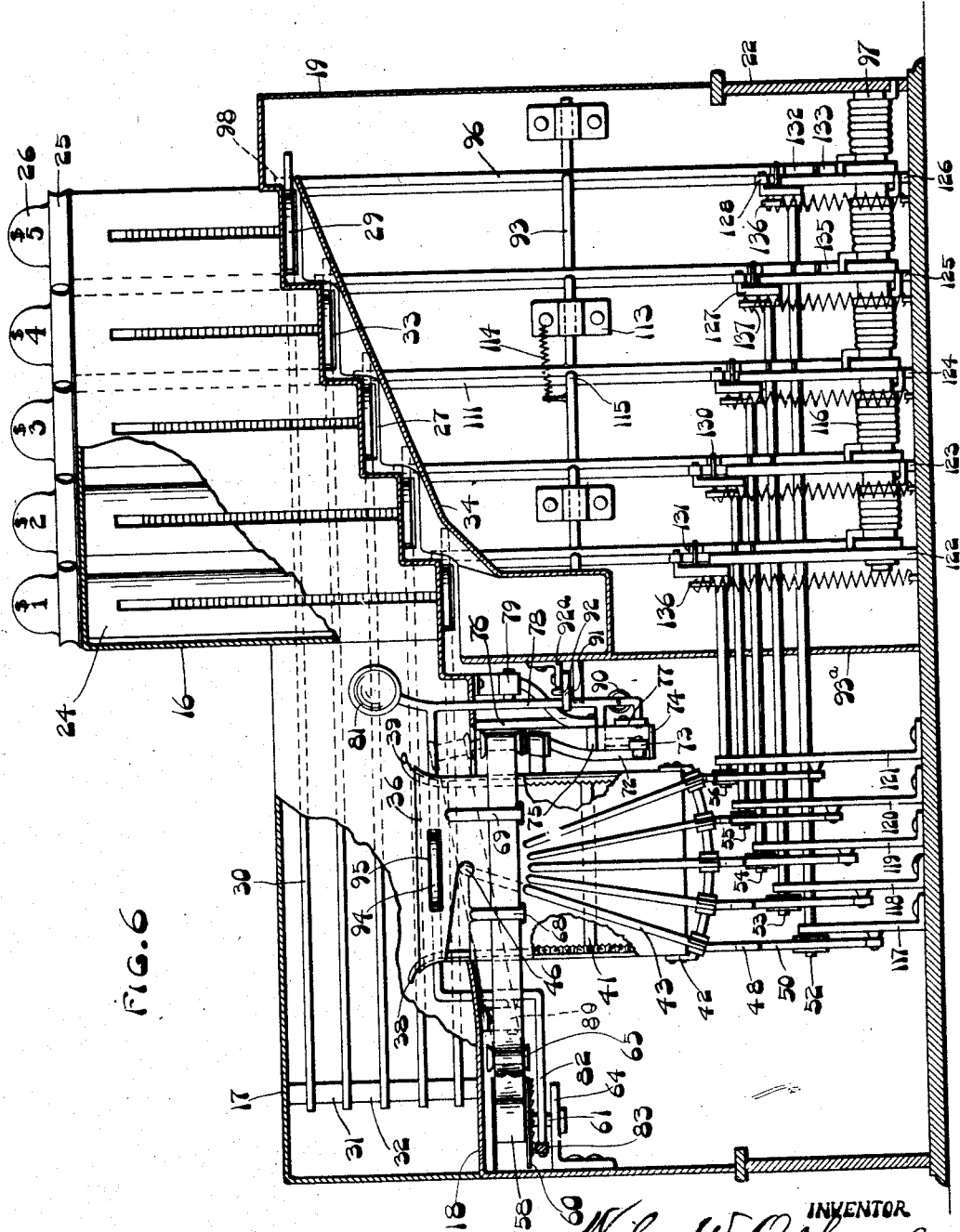
INVENTOR
Wiley W. Osborne
BY
James N. Ramsey
ATTORNEY.

Patented Nov. 6, 1928.

1,690,874

UNITED STATES PATENT OFFICE.

WILEY W. OSBORNE, OF CINCINNATI, OHIO, ASSIGNOR, BY DIRECT AND MESNE ASSIGNMENTS, TO THE OSBORNE CREDIT MACHINE COMPANY, OF CINCINNATI, OHIO, A CORPORATION OF OHIO.

ISSUING AND RECORDING TRADE-CHECK-CREDIT MACHINE.

Application filed July 10, 1920, Serial No. 395,220. Renewed August 8, 1928.

By way of explanation, that the application of my invention might be made clear to all, I will take as example a coal mine office and commissary, which is only one of the several industries that might employ the use of my machine to great advantage.

As coal mines are usually situated along lines of railroads some distance from towns and cities, the coal company maintains a camp, consisting of sufficient housing facilities for its employees, together with a coal company, store or commissary sufficiently large to supply its employees with all the necessaries of life. Most coal companies pay their employees twice a month, but as soon as a man has started to work and gets some time to his credit in the office, of the company, he can go to that office and get scrip for any desired amount not exceeding his credit on the payroll, and then take this scrip to the coal company's commissary and exchange it for merchandise in amount equivalent to the face value of the scrip.

This scrip is merely an order in the form of what is known as a paper punch-out check, card punch-out, coupon scrip or other similar scrip. The amount traded is the amount punched out of the scrip or torn off in coupons. The amount of scrip drawn by the employee is deducted from his credit on the payroll.

To avoid the continuous expense of paper scrip, which can only be used once and to eliminate so much work on the part of the bookkeeper in issuing and posting from stubs of scrip checks, etc., to the ledger or payroll in individual amounts and to protect him against mistakes, I expect to use in my machine a metal trade check or token or a similar hard substance, which is issued in certain denominations at the office of the company, the store having a supply of smaller denominations for change making. This metallic token becomes a circulating medium between store and office, and an object of my invention is to provide a means for issuing and recording same mechanically. This invention also relates to a new credit system which is embodied in the token or trade check issuing and recording machine which is hereinafter described. After the machine has been charged or filled with tokens or similar trade checks of different denominations, representing different values in merchandise at the store of the issuing company, the operator by the pulling of a single lever representing the amount of credit desired by the employee or customer, ejects the desired amount of tokens, the machine simultaneously making the correct charge on the company's record card and on the employee's or customer's stoppage card (which he usually holds in evidence of the amount of tokens that he draws from time to time). This card also serves as identification or authorization for members of his family or others whom he may send to the office for tokens, the machine running up totals to show the amount of business for the day and month. The daily total shows business for the day and the monthly total is used principally in verifying the total postings from the record cards to the ledger or payroll at the end of the month or half month. The monthly registering mechanism should agree at all times with the total of credit charged on the record cards. Thus if the individual totals on the cards are transferred correctly from cards to ledger, the grand total on the ledger will agree with the monthly total. Although this machine is capable of use in all stores or places of business where credit is extended to its customers, it is more particularly designed to replace the foregoing scrip systems as well as other similar credit and scrip systems in present use in mines, lumber and construction camps, oil field offices and commissaries, as well as all other industries maintaining for the benefit of its employees a company store or commissary.

In connection with this machine, I expect to use a rack or a suitable means for holding a record or ledger card for every employee listed on the payroll. The top of each card exposing name and number of employee and being arranged in numerical order, enables the operator when an employee presents his stoppage card and asks for a certain amount of credit, to instantly remove the corresponding ledger car from the rack, insert the two in the machine, back to back, and pull a lever representing the amount desired, thus completing the operation of issuing the tokens.

In the accompanying drawings, which form a part hereof, I have exemplified preferred forms of my apparatus; but as I am aware that various changes and modifications may be made therein within the scope of my invention and without departing from the spirit thereof, I desire to be limited only by the scope of said claims.

Referring to the drawings:

Fig. 1 is a front elevation of the machine embodying the present invention;

Fig. 2 is a detail plan view showing ejectors, tubes, locking lever and card receptacle taken substantially on lines 2—2;

Fig. 3 is a transverse vertical section through the machine, showing operating levers, ratchet rack and pawls for compelling complete stroke of said levers in both directions, indicating mechanisms and actuating pawls thereto; and connections with means for tripping or throwing pawls, actuating rods connected with and operating the printing mechanism taken substantially on lines 3—3;

Fig. 4 is a transverse vertical section of the left hand side of the machine showing the typing or printing mechanism and means for actuating the ribbon lifting shaft by toggle joint, lifting arm and locking lever taken substantially on lines 4—4;

Fig. 5 is a detailed plan view showing the ribbon mechanism, printing mechanism, locking device and detail indicating or counting mechanisms taken substantially on lines 5—5;

Fig. 6 is a vertical longitudinal section with the lower portion broken away, showing part of the operating levers, the locking device, and means for tripping the pawls controlling movement of rods connected with and actuating the printing mechanism; the card receptacle, the locking lever, the lifting shaft carrying the ribbon idler and ribbon, actuated by a toggle joint on the lower end of the locking lever, the upper portion of the machine being partly broken away to show the mounting of the ejectors and trade check tubes taken substantially on lines 6—6;

Fig. 7 is a sectional side view of the ribbon mechanism;

Fig. 8 is a perspective view of the date line regulator for the cards;

Fig. 8ª is a perspective view of a locking lever with push button;

Fig. 9 is a plan view of a stoppage, record or ledger card;

Fig. 10 is a detail plan view of the tripping lever, spring lever, and latching pawls mounted on the shafts or rods which actuate the printing mechanism, the tripping lever, spring lever, springs and latching pawls serving as a governor to the printing mechanism and insuring a deep, clear printing on the cards.

My invention is embodied in the machine illustrated in the accompanying drawings and consists in a series of sub-mechanisms which cooperate in producing the desired results and which are a token storing and ejecting mechanism, a card record printing mechanism, an operating mechanism for the ejecting and printing mechanisms, and indicator mechanisms for showing daily and monthly totals of accounts. The token storing and ejecting mechanism is contained within two portions 16 and 17 of the casing of the machine, the card record printing mechanism being contained within a portion 18 of the casing and the operating mechanism being contained within a portion 19 of the casing with the daily and monthly registering mechanisms located within the respective portions 20 and 21 of the casing. This casing consisting of the portions just enumerated, is mounted on a base 22 containing a drawer 23 for the placing therein of record books, tokens, etc. The storing portion of token storing and ejecting mechanism consists of a series of tubes 24 which terminate at their upper ends in a series of slots 25 which have indicators 26 for the indication of the denominations of the tokens located in the different tubes. The lower ends of the tubes are closed by plates 27 upon which the stacks of tokens located therein rest. At the rear of each tube a slot 28 is provided for the entrance therein of a tongue 29 formed integrally with its one of a series of ejectors 30 extending into portion 17 of the casing and pivoted on a vertical pin 31 located therein. The lower ends of the tubes 24 are stepped with relation to one another so that the ejectors 30 are located beneath each other, a short sleeve 32 being located upon the pivot pin 31 between each pair of ejectors for holding them apart. The token ejected from each tube upon the entrance therein of its one of the tongues 29, passes through a slot 33, at the front of each tube and drops onto an inclined chute 34 which leads to a small scoop or basin 35 which projects beyond the casing 19 so that the coin may be removed by hand.

The record printing mechanism which cooperates with the token storing and ejecting mechanism which I have just described is located within the portion 18 of the casing as has been previously stated, and is provided with a card receiving receptacle 36 which extends downwardly within the casing and is adapted to receive a card holder 37, such as shown in Fig. 8. This holder passes readily between the sides of the receptacle 36 and has its upper ends 38 and 39 extending above the receptacle for lifting the holder therefrom. The holder is arranged to receive a card 40 adapted to contain the record of the party whose name appears on the card. A bar 41 which is retained in various adjusted positions between the branches of the holder, is provided for supporting the card in the different positions of elevation it should have to correspond with the different days of the month upon which the card is used for recording the record of tokens issued by the machine upon the different days. The holder as well as the card, bears a series of numbered spaces corresponding to the dates on which the card is used. Preferably the card is of a width substantially equal to one-half of the space between the branches of the holder so that it may be slipped back and forth. Adjustment of bar 41 between the branches of holder 37 is afforded by means of a series of serrations as shown in Fig. 8. Extending across the bottom of the receptacle 36 a curved bar 42 is secured, this bar having pivoted thereon at intervals a series of pairs of type bars 43 and 44, the upper ends of which are at right angles to the body of the bars and have numerical type characters 45 thereon as shown in Fig. 5. The curvature of bar 42 and the general arrangement of type bars 43 and 44 is such that regardless of which pair of bars is operated, they will always strike within an aperture 46 centrally located adjacent to the top of the receptacle 36. Each pair of type bars has a depending pair of fingers 47 and 48, finger 47 being preferably integral with bar 44 and finger 48 being preferably integral with bar 43. Between the fingers 47 and 48 are a pair of levers 49 and 50 which are pivoted at their lower ends on a standard 51 and which are adapted to be moved apart to throw the type bars toward one another as shown in dotted lines in Fig. 4. To move each pair of levers 49 and 50 apart, I have provided a series of shafts 52, 53, 54, 55, and 56 in the end of each of which a pin 57 is located between the levers 49 and 50 so that when the shaft is rocked the pin will be moved toward horizontal position to force the levers apart and thus cause the type bars to move toward one another into printing position as shown by dotted lines in Fig. 4. In order to rock the shafts 52 to 56, inclusive, the mechanism which is also employed for operating the ejectors is used, a detailed description of which will be given hereinafter. In order to give an inked impression of the type on the record card located within the receptacle 36, at the time the type bars are moved to make the impression through the apertures 46, I have provided an inked ribbon 58 which is like a typewriter ribbon and which is reeled upon spools 59 and 60 which are pivotally mounted on pins 61 and 62 on brackets 63 and 64 secured to the inner wall of the casing 18. A series of rollers 65, 66 and 67 is provided for carrying the ribbon along each side of the receptacle 36, guides 68, 69, 70 and 71 being provided on the receptacle for holding the ribbon against the sides thereof. Roller 66 is pivotally mounted upon a pin 72 having a curvelinear motion as shown in dotted lines in Fig. 6. This pin is provided at its lower end with a roller 73 which rests against a curved lever arm 74 pivoted at its rear end 75 at the lower end of a bracket 76. A link 77 is connected at its forward end to lever 74 and at its rear to the lower end of a peculiarly shaped locking lever 78 which is pivoted in brackets 79 and 80 depending from the under surface of the top of casing 18. At its upper end lever 78 is provided with a push button 81. Lever 78 has a depending portion 82 beneath its bearing 80 which carries a pawl 83 having a spring 84 adapted to hold its toothed end 85 into engagement with a series of ratchet teeth 86 on the under surface of spool 59. After operation of the pawl 83 has caused reel 59 to roll up all of the ribbon which has been unreeled from reel 60, a pin 87 which has a short pin 88 projecting above pawl 83, is depressed by means of knob 89 on pin 87, thereby permitting the reel 59 to be freed so that the ribbon may be wound upon the opposite spool. To retain lever 78 in the normal position shown in Fig. 4, I have provided a spring 90. The action of lever 74 by link 77 and lever 78 is to cause pin 72 to be raised, thus bringing ribbon 58 over apertures 46 so that the type may cause an inked impression from the ribbon upon the cards located in the holder 36. Cooperating with the lower end of lever 78 is a lever 91 pivoted between its ends in a bracket 92ª secured to an intermediate wall 93ª of the casing. This lever 91 is provided at its forward end with a cam shaped edge 91' (Fig. 5) for cooperation with the lower end of lever 78 (Fig. 6). The rear end of lever 91 (Figs. 5 and 6) lies adjacent to a pin 92 on a shiftable bar 93 (Fig. 5) the function of which will be hereinafter more fully explained. An added feature which will also be hereinafter explained is the provision of a tongue 94 on lever 78 (Fig. 6) and which extends through openings in the walls of the card receptacle 36.

In order to operate the ejectors 29, I have provided a series of levers 96 pivoted on a shaft 97 at the bottom of the casing and extending upwardly with fingers 98 engaging the ends of the ejectors 29. These levers are provided with forwardly extending arms 99 which project through the front of the portion 19 of the casing as shown in Fig. 1, and which are provided with upturned handles 100 for the purpose of drawing them forward. Operation of each of these levers will cause the respective ejectors to eject a token from the one of the tubes with which it is in cooperative relation. A device which I have provided for assuring a complete operation of each of the levers 96 has been provided and consists in forming on each lever a forwardly extending lug 101 (Fig. 3) upon which is a triangular shaped double toothed pawl 102 which is pivoted at a point 103 thereon and which has a pair of teeth 104 and 105 at its upper end. The lower end of pawl 102 engages either one or the other of a pair of notches in a bar 106 which is pivoted at its rear end on its one of the levers 96 and which has a spring 107 at its forward end for holding it into engagement with triangular pawl 102 so that the lever may occupy one or the other of the notches in bar 106 which determines the effective position of said double toothed pawl. Secured to the back of the casing is a forwardly projecting rack 108 for each of the levers 96. Upon each of these racks a series of ratchet teeth 109 are formed and are inclined in one direction and adjacent to these teeth another series 110 is formed and extends in the opposite direction. Teeth 110 are provided for the cooperation therewith of the tooth 104 while tooth 105 cooperates with teeth 109, when pawl 102 is rocked. Each of the levers 96 is provided with a flange 111 on one side of the rear edge, this flange being adapted to occupy a notch 112 (Fig. 5) in the locking bar 93 so that when the bar is shifted in its bearings 113 by lever 91, it will be moved against the tension of its retaining spring 114 so that its locking lugs 115 will free the levers to permit any one of them to be moved. Coil springs 116 are provided on the shaft 97 between the levers 96 and so connected therewith as to retain the levers in their retracted positions.

Carrying the shafts 52 to 56, inclusive, (Figs. 3 and 6) are a series of bearings 117, 118, 119, 120 and 121 located beneath the card receptacle 36, as well as a series of bearings 122, 123, 124, 125 and 126 supporting the opposite ends of the shafts and located adjacent levers 96. Each of the shafts 52 to 56, inclusive, carries upon one side of its one of the bearings 122 to 126, inclusive, a loosely mounted crank 127 which is connected at its upper end with a connecting rod 128 having pivotal connection with its one of the levers 96 at a point 129 thereon. Each crank 127 is provided with a pin 130 which engages the hooked rear end 131 of a cam 132 secured to each of the shafts 52 to 56, inclusive, on the opposite side of the bearing from the crank 127. Pivotally mounted on each bearing in front of cam 132 is dog 133 which has its notched end in engagement with the toothed forward end 134 of each cam 132. Each dog is provided with a spring 135 for holding it into engagement with its cam 132. On each of the shafts 52 to 56, inclusive, is secured an arm 136 to the end of which is attached a spring 137 which has its lower end secured to the base of the machine. The action of this spring is to cause its one of the shafts to be rotated quickly through an arc of a circle when the cam 132 is released by having its dog 133 lifted therefrom by the cooperating pin 130 on crank 127. Inasmuch as each of the shafts 52 to 56, inclusive, is connected with the record printing mechanism previously described, the printing mechanism will be released as will be hereinafter set forth.

In order that the daily totals created by the actuation of the machine, may be registered, I have provided a series of counting mechanisms 138 (Figs. 3 and 5) which are each actuated by a pawl 139 on a link 140 attached to each lever 96. The construction of these registering mechanisms need not be described as they are already well known. The indications made by these mechanisms are rendered visible through sight apertures 141 in portion 20 of the casing. A series of devices 142 for giving the monthly totals is similarly actuated by means of a pawl arm 143 attached to each of the levers 96. This series of devices is located within portion 21 of the casing and the records made thereby are visible through sight apertures 144 in portion 21.

The operation of my improved machine is as follows: The bookkeeper or storekeeper in whose office or store the machine is located, prepares for the employee or customer a record card such as shown in Fig. 9 and at the same time prepares a duplicate card for his own use. This duplicate card is kept by the bookkeeper in a rack adjacent to the machine so that when the customer comes into the office and presents his card to the bookkeeper, the bookkeeper will remove the duplicate card from the rack. In place of keeping the cards in a separate rack, a filing arrangement in the drawer 23 may be utilized, the drawer also being useful in keeping a stock of new cards and tokens. Having both the customer's and his own card in hand the bookkeeper now places the cards back to back with the titles at the top and places them within the card receptacle 36, the bar 41 in the holder 37 having been placed at the beginning of the day in the notches corresponding to the date upon which the customer presented the card to obtain tokens. This permits the cards to be moved as one with the proper date line in alinement with the aperture 46 in the receptacle. The cards being of substantially one-half of the width of the receptacle they may be moved across the receptacle upon bar 41 to bring them into position to have the record of tokens issued printed on them in the proper place. In order to place them in the receptacle the bookkeeper will have first had to push back key 81 thereby removing tongue 94 from aperture 95 of the receptacle 36. The cards having been placed in the receptacle the key 81 is released thereby allowing the tongue 94 to press against the cards, thus retaining them in printing position regardless of their elevation. The act of pushing the key 81 back causes the lower portion of lever 78 to be moved toward the front thereby causing link 77 to first lift and then lower lever arm 74 thereby moving ribbon 58 to dotted line position, Fig. 6, and then to drop it to full line position. This extreme rear position of key 81 then permitted unobstructed view of the position of the card through the aperture 46. Having properly positioned the card the bookkeeper released the key and thereby permitted tongue 94 to engage the rear face of the back card in the receptacle. This limited the return movement of key 81 and consequently stopped the ribbon in the raised dotted line position shown in Fig. 6. A simultaneously performed function when the key 81 is operated, lies in the unlocking of all the ejector operating levers 96. This is accomplished by the passing of the lower end of lever 78 over the cam shaped edge of lever 91, which results in moving lever 91 upon its pivot and in pushing against pin 92 of bar 93, which causes the bar to shift against the tension of its spring 114 and to remove its locking lugs 115 from the flanges 111 of the ejector operating levers. Incidentally, the movement of key 81 also results in the feeding of the inked printing ribbon 58 by causing portion 82 of lever 78 to cause pawl 83 to rotate reel 60 and thus wind up a small amount of ribbon to present a fresh portion thereof to the aperture 46.

The machine, after the above described operations have been performed, is then in condition for operation of the levers 96. Inasmuch as the operation of each of these levers and their connected mechanisms is identical, but one of them and its connected mechanisms will be described. For convenience it will be assumed that the employee or customer desires the issuance of a token of the trade value of five dollars. The bookkeeper then pulls upon handle 100 of the ejector operating lever, the finger 98 of which operates the five dollar ejector. This handle lies immediately to the right of the five dollar indicator as shown in Figs. 1 and 2. Forward movement of this finger 98 causes the five dollar ejector 30 to be moved upon its pivot 31 to bring its ejecting tongue 29 through slot 28 of the five dollar tube and to push the bottom token from the stack in the tube, through the slot 33 in the front of the tube and onto the inclined chute 34 over which it slides into the hand scoop 35 from which it is removed to be handed to customer. In the forward movement of the lever 96 the pawl 104 in riding over teeth 110 prevents return movement of the lever until the forward stroke is finished, thus assuring ejection of the coin and complete operation of the other portions of the mechanism, the operation of which will be described. Upon completion of the forward stroke, the pawl 102 will be reversed and tooth 105 will be placed in operative relation to teeth 109 with tooth 104 removed from teeth 110 by said pawl striking against a pin under teeth 109 in ratchet rack 108. This assures complete return of lever 96 before it can again be drawn forward.

At the same time that lever 96 is operated, the printing mechanism is operated to record the value of the token issued to the employee or customer. This printing of the record is effected in the following manner upon both the customer's and bookkeeper's cards simultaneously. As the lever 96 moves forwardly, the connecting rod 128 connected therewith causes crank 127 to be rotated upon its mounting shaft 52. The pin 130 moving over the curved edge of cam 132 finally engages the end of dog 133 and withdraws it from engagement with the tooth 134 of the cam. The cam being under tension of its spring 137 is thus permitted to move rapidly until its finger 131 stops its movement upon engaging pin 130. Shaft 52 being attached to cam 132, the spring 137 therefore acts to rotate it and bring its pin 57 into dotted line position, Fig. 4, thereby moving levers 49 and 50 apart and causing type bars 43 and 44 to be moved rapidly into contact with the inked printing ribbon and resulting in printing upon the cards a record of the fact that a five dollar token has been issued to the respective employee or customer. Upon return of lever 96 to normal position the pin 130 of crank 127 bears against finger 131 and returns the cam 132 and its connected shaft 52 and pin 57 to normal position against the tension of spring 137. Dog 133, when the lever has completed its return stroke, drops over tooth 134 of cam 132 and holds it until again released. The advantage of a construction having the above described operation is that the printing of the record is always assured in a legible manner whether the lever 96 has been drawn forward rapidly or slowly.

The operation of the daily and monthly registering mechanisms 138 and 142, respectively, is occasioned each time the lever 96 is operated, thus enabling the bookkeeper to check up on the number and amount of the tokens issued. After the operation of the entire mechanism has been completed, the bookkeeper hands the customer the token and the customer's card, returning his own duplicate record card to the rack.

Access to the daily and monthly registering mechanisms for resetting same to zero by hand, is provided by a lock and hinged section of the casing forming registering mechanism housing adapted to be unlocked and swung open.

The above described operations are carried out regardless of which one of the handles 100 is pulled, except that each handle causes the operation of a different pair of type bars corresponding to the value of the token ejected and while the form of mechanism herein shown and described is admirably adapted to fulfill the objects primarily stated, it is to be understood that it is not intended to confine the invention to the one form of embodiment herein disclosed, for it is susceptible of embodiment in various forms, all coming within the scope of the claims.

What is claimed is:

1. In a trade-check issuing register, a card receptacle adapted to receive two record cards oppositely faced, a set of type bars mounted in back of said receptacle, a set of type bars mounted in front of said receptacle corresponding to said set of type bars mounted in back of said receptacle forming pairs with like type characters facing said card receptacle, depending prongs for said type bars, a spring functioned operating mechanism adapted to swing said type bars on their pivot, bringing type characters toward one another, and means to operate said type bars.

2. In a trade-check credit machine, a card receptacle adapted to receive a date line regulator comprising a substantially U-shaped element with the inner walls of the vertical arms each having a series of corresponding notches and the outer walls having a series of corresponding indicating characters and a laterally detachable and removable cross bar having notched ends adapted to engage the notches of said arms in any adjusted position desired, substantially as set forth and for the purpose specified.

3. In a trade-check credit machine, a record receiving means support, a set of impression devices on one side thereof, a duplicate set of impression devices on the opposite side thereof, record receiving means in said support, and means for operating both sets of impression devices to make a record on said record receiving means, said receiving means serving as a platen for said impression devices.

4. In a trade-check issuing and recording register, the combination with duplex printing mechanism of an energy storing and releasing mechanism therefor adapted to cause a uniform action thereof, comprising an oscillating shaft with a detent segment fixed thereon, spring tension means, a detent dog, tripping means therefor provided with means adapted to disengage said detent dog from said detent segment to permit said detent segment and its shaft to yield to said spring tension means, and a lug on said detent segment for engagement with said tripping means for restoration of said detent segment to latching position against said spring tension.

5. In a trade-check credit machine, a visible duplicate printing mechanism comprising opposed printing elements and a card receptacle adapted to accommodate two removable cards positioned to receive simultaneously, on opposite faces, inked impressions from said printing elements.

6. In a trade-check credit machine, a card receptacle adapted to hold removable cards, and date-line adjustment means in said receptacle for holding the cards at the proper elevation to receive the inked impression on the desired date-line.

7. In a trade-check credit machine, the combination of duplicate printing mechanism comprising opposed printing elements, an interposed means for holding two removable cards, and adjustment means in said holder for raising or lowering said cards to a proper date line; said cards also being laterally movable in the holder to determine where the printing is to take place.

8. In a trade-check issuing register, a duplex functioning mechanism, a recording mechanism comprising a duplicate set of type adapted to be actuated in pairs by means of said duplex functioning mechanism, an energy storing mechanism for each of said set of type comprising shafts disposed in standards, tension springs therefor, detent flange segments fixed on said shafts, trip dogs mounted on said standards to engage said detent flange segments, bell crank levers loosely mounted on said shafts with pins to engage lugs on said detent flange segments and trip dogs, connecting links for said bell crank levers and operating keys, means whereby depression of said operating keys causes disengagement of said trip dogs and detent flange segments permitting the shafts to yield to said spring tension imparting a uniform energy to said duplex type functioning mechanism to produce a uniform impact of type, substantially as described.

9. In a trade-check credit machine, check issuing means, a receptacle for holding record-receiving elements with record-receiving faces oppositely presented, record-marking elements to have operations on respective ones of said faces, and means whereby operation of said issuing means causes said operations of said record-marking elements.

WILEY W. OSBORNE.